United States Patent
Crabtree

[15] 3,666,759
[45] May 30, 1972

[54] SUBSTITUTED ANILINO-S-TRIAZINES

[72] Inventor: Allen Crabtree, Manchester, England

[73] Assignee: Imperial Chemical Industries Limited, London, England

[22] Filed: Aug. 3, 1970

[21] Appl. No.: 60,616

Related U.S. Application Data

[63] Continuation-in-part of Ser. No. 681,584, Nov. 8, 1967, abandoned.

[30] Foreign Application Priority Data

Nov. 14, 1966 Great Britain......................50,913/66

[52] U.S. Cl. ..................260/249.5, 260/249.8, 260/256.5 R
[51] Int. Cl.......................................C07d 55/20, C07d 55/18
[58] Field of Search....................................260/249.5, 249.8

[56] References Cited

UNITED STATES PATENTS 3,589,921  6/1971  Allison et al........................260/249.8

Primary Examiner—John M. Ford
Attorney—Cushman, Darby & Cushman

[57] ABSTRACT

Compounds of the formula:

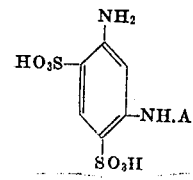

in which A is a halogeno-pyrimidyl or halogeno-s-triazinyl group are valuable dyestuff intermediates, notable for the speed of coupling of the derived diazonium salts. In the case of the triazine compounds, the heterocyclic nucleus can contain substituents other than halogen, notably methoxy, amino or sulphonated anilino and its common derivatives.

3 Claims, No Drawings

SUBSTITUTED ANILINO-S-TRIAZINES

This application is a continuation-in-part of application, Ser. No. 681,584, filed Nov. 8, 1967, now abandoned.

It has been found that certain mono- substituted derivatives of 1,3-phenylenediamine-4,6-disulphonic acid are valuable dyestuff intermediates, notable for the speed of coupling of the derived diazonium salts. In general terms these derivatives have halogeno-pyrimidine or halogeno-s-triazine substituents on one of the amine groups so that the dyestuffs derived therefrom by diazotization and coupling are cellulose-reactive dyestuffs.

The use of analogous 1,3-phenylenediamine-4-sulphonic acid derivatives in a similar way has been described in, for example, U.S. Spec. Nos. 2,860,129, 2891 940-1, 2945 021 and 2 993,885. Unexpectedly, however, it has been found that the new amines provide diazonium salts which couple at a much higher speed than those from the monosulphonic acid, especially in acid media. Hence, in addition to providing a wide range of new dyestuffs of higher solubility, the opportunity is provided of a much higher rate of production of azo dyestuffs.

The new compounds are represented by the formula:

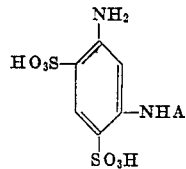

in which A is a halogeno-pyrimidyl or halogeno-s-triazine group. More especially A can represent a 2,4-dichloro-pyrimid-6-yl radical or a 4,6-dichloro- pyrimid-2-yl radical, a 2,4,5-trichloro-pyrimid-6-yl or 4,5,6-trichloro-pyrimid-2-yl radical, a 2,4,-dichloro-s-triazin-6-yl radical or a 2,chloro-striazin-4-yl radical in which the 6- position carries one of the substituents $NH_2$, anilino, mono- or di-sulpho anilino, sulphotoluidino, sulphoansidino and methoxy.

The new compounds can be prepared by reacing 1,3-phenylene diamine -4,6-disulphonic acid with 1 molar proportion of a heterocyclic compound of formula A·Cl where A has the meaning stated above. As examples of these compounds there may be mentioned:

2,4,6-trichloro pyrimidine
2,4,5,6-tetrachloropyrimidine
cyanuric chloride
2,4-dichloro-6-methoxy-s-triazine
2,4-dichloro-6-amino-s-triazine
2,4-dichloro-6-anilino-s-triazine
2,4-dichloro-6-m-sulphoanilino-s-triazine
2,4-dichloro-6-p-sulphoanilino-s-triazine
2,4-dichloro-6-(3',5'-disulphoanilino)-s-triazine
2,4-dichloro-6-(5'-sulpho-2'-methylanilino-s-triazine
2,4-dichloro-6-(3'-sulpho-4'-methylanilino-s-triazine
2,4-dichloro-6-(3'-sulpho-4'-methoxyanilino-s-triazine Interaction can conveniently be carried out by stirring, the heterocyclic compound and the phenylene diamine disulphonic acid in an aqueous medium of 0°-60° C. Preferably the reaction mixture should be maintained slightly acid or about neutrality by adding an inorganic acid-binding agent, e.g., sodium carbonate, to neutralize the hydrochloric acid formed during the reaction.

Alternatively, in the case of the anilino or substituted anilino compounds, the new amines can be obtained by first condensing the 1,3-phenylene disulphonic acid with cyanuric chloride and then condensing the resultant product with the aniline compounds.

The new amines are soluble in water. They can isolated from the reaction mixture in which they have been prepared by conventional methods, e.g., by salting and filtration, or by evaporation of the reaction mixture. However isolation is unnecessary if the amine is to be used as the diazo component for the synthesis of an azo dyestuff. In such a case, diazotization can be effected in the usual manner, if necessary after cooling the mixture after reaction is complete, by adding mineral acid and an alkali metal nitrite.

The invention is illustrated but not limited by the following examples in which parts and percentages are by weight:

EXAMPLE 1

A solution of 13.4 parts of 1,3-phenylene diamine-4,6-disulphonic acid in 100 parts of water at pH 4-5 is added dropwise to a suspension of 9.25 parts of cyanuric chloride in 50 parts of acetone and 120 parts of a mixture of ice and water. The mixture is stirred at 0°-5° C., keeping the pH at 4-5 by addition of sodium carbonate solution as required. Condensation is complete after 1½ hours.

The resulting solution can be converted to the diazonium salt directly by adding 10 parts of ION hydrochloric acid and sufficient 2N sodium nitrite solution to give a slight excess of nitrous acid. This solution couples substantially completely with 1-amino-8-naphthol-3,6-disulphonic acid at pH 2.0 in 1 hour at 0°-5° C.

In contrast, when the mono-condensation product of 1,3-phenylenediamine-4-sulphonic acid and cyanuric chloride is used as diazo component under the conditions described above it is found that coupling ortho to the amino group of the 1-amino-8-naphthol-3, 6-disulphonic acid is only 10-20 percent complete after 1 hour, and even after stirring for 18 hours at 0°-5° C. and pH 2.0 less than 30 percent of the desired product has been obtained.

EXAMPLE 2

To a solution of 20.8 parts of the mono-condensation product of 1,3-phenylenediamine-4,6-disulphonic acid and cyanuric chloride in 350 parts of water at pH 6.5 and 0°-5° C. (prepared as described in EXAMPLE 1) is added 5.2 parts of ammonia dissolved in 20 parts of water. The solution is then heated to 35°-40° C. for 1½ hours, cooled to 0°-5° C., and acidified with 15 parts of ION hydrochloric acid solution. The mixture is then diazotized by the dropwise addition of 25 parts of 2N sodium nitrite solution.

To the stirred diazo suspension above is then added dropwise a solution of 13.3 parts of 1-amino-8-naphthol-3,6-disulphonic acid in 100 parts of water at pH 6.5. The pH of the mixture is then adjusted to 2.0 (if necessary) and stirred at 20° C. for 4 hours when coupling is substantially complete.

If, in place of the mono-condensation product of 1,3-phenylenediamine-4,6-disulphonic acid and cyanuric chloride, prepared above, there is used an equivalent quantity of the mono-condensation product of 1,3-phenylenediamine-4-sulphonic acid it is found that even after coupling for 18 hours at pH 2.0 and 20° C. coupling is only about 60 percent complete.

EXAMPLES 3 to 13

If, in place of the secondary condensation product 1,3-phenylenediamine-4,6disulphonic acid, cyanuric chloride and ammonia, there is used the mono-condensation product of 1,3-phenylene-diamine-4,6-disulphonic acid and 2,4,6-trichloropyrimidine, 2,4,5,6-tetrachloropyrimidine, or 6-methoxy-2,4-dichloro-s-triazine, there are obtained on diazotization as described above, diazo components which couple substantially to completion to 1,-amino-8-naphthol-3,6-disulphonic acid at pH 2.0 and 20° C. in 4 hours.

Further examples of the invention which are capable of coupling substantially to completion to 1-amino-8-naphthol-3,6-disulphonic acid in 4 hours under the conditions described above, can be prepared by diazotizing the product of condensation of one equivalent of any of the amines described below with one equivalent of the mono-condensation product of 1,3-phenylenediamine-4,6-disulphonic acid and cyanuric chloride.

Amines aniline, 1-aminobenzene 3- or 4- sulphonic acid, 1-amino-benzene-3,5-disulphonic acid, 2-aminotoluene-4- or 5-sulphonic acid and 2-methoxy aniline - 4- or 5- sulphonic acid.

I claim:

1. A compound of the formula:

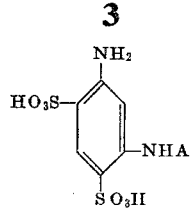

wherein A is selected from the group consisting of 2,4-dichloro-s-triazin-6-yl, 2-chloro-4-methoxy-s-triazin-6-yl, 2-chloro-4-amino-s-triazin-6-yl, 2-chloro-4-anilino-s-triazin-6-yl, 2-chloro-4-monosulpho or -4-disulpho-anilino-s-triazin-6-yl, 2,-chloro-4-sulphotoluidino-s-triazin-6-yl, and 2-chloro-4-sulphoanisidine-s-triazin-6-yl.

2. A compound according to claim 1 wherein A is selected from the group consisting of 2,4-dichloro-s-triazin-6-yl and 2-chloro-4-methoxy-s-triazin-6-yl.

3. The compound of the formula:

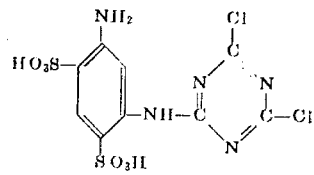

* * * * *